United States Patent [19]
Tateno

[11] 3,732,859
[45] May 15, 1973

[54] BRAIN WAVE MEASURING APPARATUS

[75] Inventor: Keiji Tateno, Nakano-ku, Tokyo, Japan

[73] Assignee: Nihon Kohden Kogyo, Ltd., Tokyo, Japan

[22] Filed: Feb. 1, 1971

[21] Appl. No.: 111,540

[30] Foreign Application Priority Data

Feb. 2, 1970 Japan ................................. 45/8577

[52] U.S. Cl. .............................................. 128/2.1 B
[51] Int. Cl. .............................................. A61b 5/00
[58] Field of Search ................. 128/2.06 B, 2.06 E, 128/2.06 R, 2.1 B, 2.1 E, 2.1 R

[56] References Cited

UNITED STATES PATENTS

| | | | |
|---|---|---|---|
| 3,602,215 | 8/1971 | Pavnell | 128/2.06 B |
| 2,748,202 | 5/1956 | McCallister et al. | 128/2.06 B |
| 3,604,411 | 9/1971 | Schuler | 128/2.1 B |

Primary Examiner—William E. Kamm
Attorney—Chittick, Pfund, Birch, Samuel & Gauthier

[57] ABSTRACT

In brain wave measuring apparatus comprising at least two electrodes adapted to be contacted against the skin of a living body and an amplifier with its inputs connected to the electrodes, serially connected impedances of equal values are connected across the inputs of the amplifier and a source of check signal is provided to be connectable to the juncture between the impedances.

7 Claims, 3 Drawing Figures

BRAIN WAVE MEASURING APPARATUS

BACKGROUND OF THE INVENTION

This invention relates to brain wave measuring apparatus, and more particularly to novel brain wave measuring apparatus capable of checking the magnitude of the contact resistance difference of electrodes contacted with a living body, particularly a human body, without interrupting the brain wave measurement.

Generally, a conventional brain wave measuring apparatus comprises a plurality of electrodes adapted to be contacted against a living body, an amplifier for amplifying brain wave signals picked up by the electrodes and a brain wave recorder for recording the output from the amplifier. Among the signals applied to the amplifier are included the brain wave signals to be measured, signals not desired for the brain wave measuring apparatus such as AC hum signals, cardio-signals created by cardio-electromotive forces or other noise signals. For this reason, in order to satisfactorily discriminate the brain wave signals from another undesirable signals it is important to increase the discrimination ratio of the amplifier and the input circuits.

Before describing the subject matter of the invention, the discrimination ratio will first be discussed with reference to FIG. 1 which shows a connection diagram of a prior art brain wave measuring apparatus. In this figure, reference characters 1 and 2 show contact resistances of electrodes assumed to have resistance values of $R_1$ and $R_2$ respectively. These resistances are connected to input terminals of an amplifier 3 whose output is supplied to a brain wave recorder 4. Numerals 5 and 6 show a source of brain wave signal $e_s$ generated by a human body and a source of noise $e_n$ other than the brain wave. Input resistors 7 and 8, each having a resistance of $R_g$, are connected in series across input terminals of amplifier 3, the juncture between these resistors being grounded. Supposing an ideal amplifier, the amplification degrees wherein signals $e_n$ and $e_s$ are in phase and opposite phase on the input circuit of the amplifier are given by following equations.

The output voltage $E_{os}$ of opposite phase signals $$(E_{os}) = \frac{2R_g}{2R_g + R_1 + R_2} A \cdot e_s$$

if $$2R_g \gg R_1 + R_2,$$

then $$E_{os} \doteq A \cdot e_s \qquad (1)$$

where $A$ represents the amplification degree of amplifier 3.

On the other hand, the output voltage $E_{on}$ of in phase signals is given by $$E_{on} = \left\{ \frac{R_g}{(R_1 + R_g)} - \frac{R_g}{(R_2 + R_g)} \right\} A \cdot e_n$$

if $$R_g \gg R_1 + R_2 R_g^2 \gg R_1 R_2$$

then $$E_{on} \doteq \frac{R_2 - R_1}{R_g} A \cdot e_n \qquad (2)$$

Since the discrimination ratio is generally given by $E_{on}/E_{os}$, if $e_s = e_{n'}$ we have $$E_{on}/E_{os} = (R_2 - R_1)/R_g \qquad (3)$$

Accordingly, where a condition $R_2 = R_1$ is satisfied it is possible to stabilize the recording operation of the brain waves. Actually however, it is impossible to make equal the contact resistances at various electrodes. thus, even when $R_1$ is not equal to $R_2$, if the values of these resistances were reduced sufficiently, the ratio $E_{on}/E_{os}$ could be made small thus enabling stable recording of the brain waves. For this reason, efforts have been made to improve the method of mounting the electrodes on the living body or to decrease the contact resistance by applying a paste onto the skin of the living body. However, a plurality of electrodes, for instance 24 electrodes, are required to be used for the measurement of the brain waves and it is difficult to decrease the contact resistances of all electrodes.

Moreover, as the measurement of the brain waves is made while the living body is maintained quiet for a long time, the contact condition between the electrodes and the skin is impaired by the drying of the paste or by the movement of the living body, thus increasing the contact resistance. Such increase in the contact resistance results in the abnormal waveform of the recorded brain waves, and it is difficult to determine whether such abnormal waveform is caused by the increase in the electrode resistance or by the abnormal condition of the brain wave per se. In order to make a correct judgement it has been the practice to interrupt the recording operation of the brain waves to check the magnitude of the contact resistances of the respective electrodes. More particularly, after stopping the operation of the recorder 4 of the brain wave measuring apparatus shown in FIG. 1, source 9 is connected to a resistance meter 10 by closing a switch 11. Then current is passed to electrode 1 or 2 through a transfer switch 12 to determine whether the abnormal waveform represented by the deflection of resistance meter 10 is caused by the increase in the contact resistance or not and a check is made as to which one of the electrodes has increased its contact resistance. Thus, such a prior method of measurement requires the interruption of the recording of the brain waves and the operation of the transfer switch 12, and is not efficient. Although in FIG. 1, a battery 9 is used as the source for checking, a source of alternating current can also be used.

SUMMARY OF THE INVENTION

It is therefore an object of this invention to provide an improved brain wave measuring apparatus by which upon occurence of an abnormal waveform in the recorded brain waves the difference between contact resistances of a plurality of electrodes can be checked promptly without the necessity of interrupting the recording operation of the brain waves.

Another object of this invention is to provide an improved brain wave measuring apparatus capable of checking the difference between contact resistances of a plurality of electrodes by utilizing a single switch.

Further object of this invention is to provide a novel brain wave measuring apparatus capable of measuring the brain waves superposed upon a checking signal from an AC oscillator even while the contact resistances of the electrodes are being checked.

A still further object of this invention is to provide a brain wave measuring apparatus capable of readily recording stable brain waves by detecting a signal proportional to the discrimination ratio between an amplifier and its input circuit for determining the difference in the contact resistances of a plurality of electrodes and by compensating for the difference in the contact resistances.

According to one aspect of this invention, there is provided brain wave measuring apparatus comprising a first electrode with one end contact with the skin of a living body, a second electrode with one end contacted with the skin of the living body, amplifier means having two input terminals respectively connected to the other ends of the first and second electrodes, brain wave recording means connected to the output terminal of the amplifier means, a series circuit including two check signal supply impedances of equal value, the series circuit being connected across the two input terminals of the amplifier means, and a source of check signals connectable to the common juncture between the check signal supply impedances.

According to another aspect of this invention there is provided brain wave measuring apparatus comprising a plurality of electrodes with their ends contacted with the skin of a living body, a plurality of amplifiers, each having two input terminals connected with the other ends of the electrodes, a plurality of brain wave recording means respectively connected to the outputs of the amplifiers, a source of check signals, and a plurality of check signal supply impedances of equal impedance value connected between the source of check signals and respective ones of the other ends of the electrodes.

BRIEF DESCRIPTION OF THE DRAWING

Further objects and advantages of the invention will be more clearly understood from the following description when taken in conjunction with the accompanying drawings in which:

FIGS. 2a and 3a are partial views of modifications of FIGS. 2 and 3, respectively.

DESCRIPTION OF THE PREFERRED EMBODIMENTS

Figure 1:
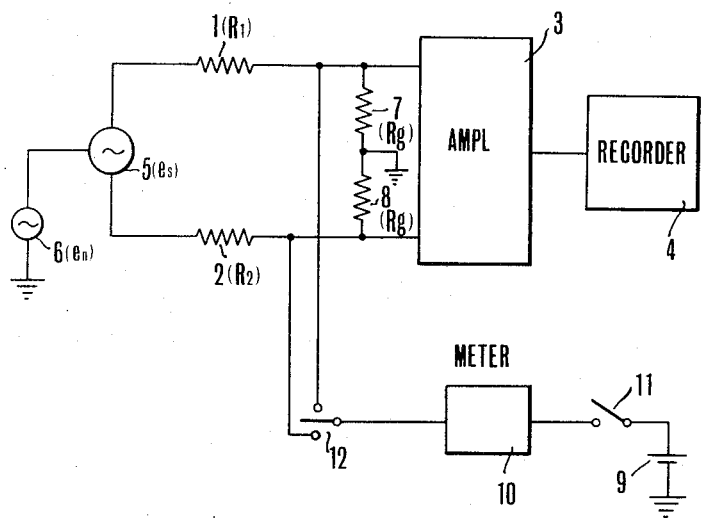
FIG. 1 is a connection diagram of a prior art brain wave measureing apparatus.
Figure 2:
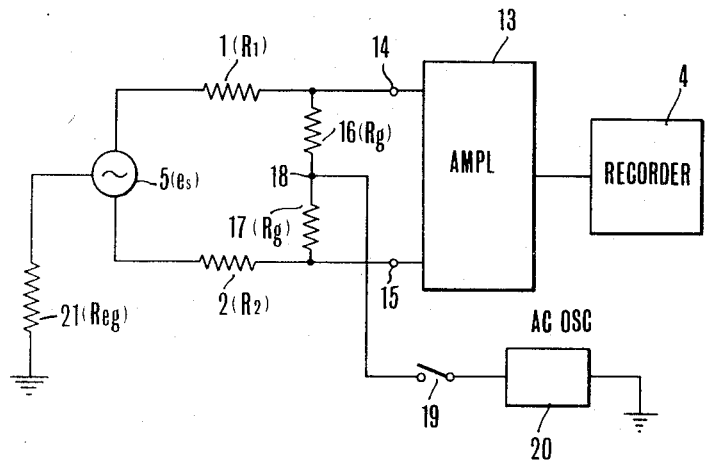
FIG. 2 shows a connection diagram, partly in block form, of one embodiment of the novel brain wave measuring apparatus

FIG. 2 shows one embodiment of the novel brain wave measuring apparatus in which elements corresponding to those shown in FIG. 1 are designated by the same reference numerals. For the sake of description, the source of noise signal 6 ($e_n$) shown in FIG. 1 has been omitted from FIG. 2. In the embodiment shown in FIG. 2, a high input impedance amplifier 13, is provided having input terminals 14 and 15. Ends of electrodes 1 and 2 are connected to the skin of a living body (not shown) or a source of the brain wave signal 5 whereas the opposite terminals of the electrodes are connected to input terminals 14 and 15 of amplifier 13. A series circuit comprised by resistors 16 and 17 of the equal resistance value $R_g$ is connected across input terminals 14 and 15 and the juncture 18 between these resistors is connected to an AC oscillator 20 for checking via a switch 19. The neutral point of the source of the brain wave signal 5 is grounded through a grounding electrode 21 having resistance $R_{eg}$.

When switch 19 is closed to connect checking oscillator 20 to the juncture 18, the output voltage $E_o$ from amplifier 13 can be expressed by the equation $$E_0 = \left( \frac{R_g}{R_g + R_1 + R_{eg}} - \frac{R_g}{R_g + R_2 + R_{eg}} \right) A \cdot g_e$$

Assuming now that $R_g > R_1 + R_2 + R_{eg}$, $R_g > R_{eg} (R_1 + R_2 + R_{eg})$ and $R_g^2 > R_1 R_2$ $$E_0 \doteq \frac{R_2 - R_1}{R_g} A \cdot g_e \qquad (4)$$

where $g_e$ represents the output voltage of checking oscillator 20.

The output voltage $E_o$ expressed by equation 4 is proportional to the discrimination ratio shown by equation 3 so that so long as the amplification degree A and output voltage $g_e$ are constant, output voltage $E_o$ becomes a function of the discrimination ratio.

In other words, while switch 19 is being closed when an abnormal waveform is recorded by recorder 4 during the measurement of the brain wave, the output voltage $E_o$ will manifest a large amplitude if the abnormal waveform is caused by the increase in the contact resistance difference of the electrodes. On the other hand, if such abnormal waveform is not caused by the increase in the contact resistance difference of the electrodes but instead caused by the defect of the brain, the waveform of the output voltage $E_o$ would not vary by the closure of switch 19 unless otherwise the contact resistance of the electrode varies from the initial value at the time of mounting the electrodes. In this manner, this invention permits one to determine whether the abnormal waveform is caused by the variation in the contact resistance of the electrode or not while the recording operation of the brain waves is being continued. If it were determined that the abnormal waveform is caused by the electrodes, the contact condition of the pair of electrodes 1 and 2 against the skin of the living body is adjusted while observing the waveform recorded on recorder 4 for obtaining stable record of the brain waves.

Generally, it is rare to perform the measurement of one channel by using a single channel involving two electrodes. There generally are 8 to 16 channels and a selected electrode is connected to the amplifier together with a common reference electrode.

Figure 3:
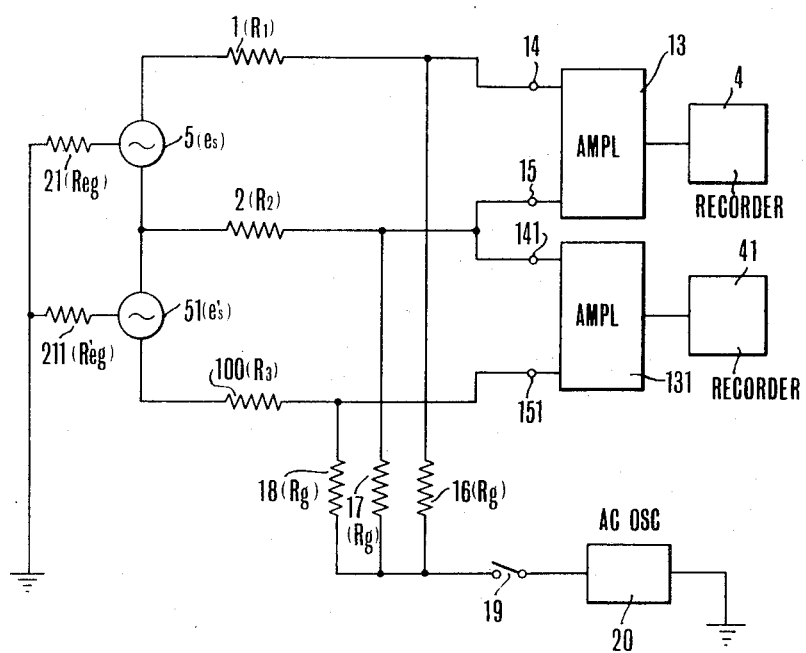
FIG. 3 is a connection diagram, partly in block form, of a modified embodiment of this invention.

FIG. 3 shows a modified brain wave measuring apparatus utilizing two channels. In this figure, electrodes 1 and 2, amplifier 13 and recorder 4 comprise one channel for measuring source of brain wave signal 5 ($e_s$) whereas electrodes 2 and 100, amplifier 131 and recorder 41 comprise another channel for measuring source of the brain wave signal 51 ($e'_s$), electrode 2 being utilized in common for two channels. One end of a high resistance 16 is connected to input terminal 14 of amplifier 13 and the corresponding end of another high resistance 17 is connected to the juncture between input terminals 15 and 141 of amplifiers 13 and 131, respectively. Further, one end of high resistance 18 is connected to input terminal 151 of amplifier 131 and the opposite ends of these high resistors are commonly connected to switch 19. These resistors 16, 17 and 18 which act to supply check signals having equal resistance value $R_g$, 5 megohms for example. An electrode grounding resistor 211 ($R'_{eg}$) may be provided, but ordinarily either one of resistors 21 and 211 suffice.

In the circuit construction shown FIG. 3, the output voltages of amplifiers 13 and 131 can be calculated in the following manner.

Output voltage $E_{o1}$ of amplifier 13:

$$E_{01} = \frac{R_g}{R_g + R_1 + R_{eg}} - \frac{R_g}{R_g + R_2 + R_{eg}} A \cdot g_s$$

if $R_g > R_1 + R_2 + R_{eg}$, $R_g > R'_g (R_1 + R_2 + R_{eg})$ and $R_g^2 > R_1 \cdot R_2$ $$E_{01} \doteq \frac{R_2 - R_1}{R_g} A \cdot g_s \qquad (5)$$

In the same manner output voltage $E_{o2}$ of amplifier 131:

$$E_{02} \doteq \frac{R_3 - R_1}{R_g} A \cdot g_s \qquad (6)$$

where $A$ and $A'$ represents the amplification degrees of amplifier 13 and 131, respectively.

Equations (5) and (6) show that even with a brain wave measuring apparatus of the multi-channel construction relations similar to that of FIG. 2 also hold true so that check signals are converted into signals proportional to discrimination ratios and appear simultaneously as the outputs of respective channels. For this reason, this invention eliminates the trouble of checking respective electrodes by manipulating the transfer switch.

According to this invention it is possible not only to check the contact condition of the electrode without the necessity of interrupting the recording operation of the brain waves but also to simultaneously check the contact condition of a plurality of electrodes by using a single switch. Further, by connecting ends of a plurality of resistors for supplying check signals to respective electrodes and by connecting the other ends of these resistors to a common source of check signals, even when a plurality of amplifiers are commonly connected to one electrode as shown in FIG. 3, it is possible to measure the brain waves at high accuracies because these input resistors are not connected in parallel with respect to the amplifiers. Although in the above described embodiments resistors are utilized as the circuit elements for supplying the check signals, if desired, the check signals may be supplied to respective electrodes through coupling transformers.

What is claimed is:

1. An apparatus for measuring the brain waves of a living body comprising a first electrode with one end adapted to be contacted with the skin of said living body, a second electrode with one end adapted to be contacted with the skin of said living body, amplifier means having two input terminals respectively connected to the other ends of said first and second electrodes, recording means for recording brain wave and signals resulting from a difference in contact resistance of said first and second electrodes and connected to the output terminal of said amplifier means, a series circuit including two check signal supply impedances of equal value, said series circuit being connected across said two input terminals of said amplifier means, and a source of check signals connectable to the common juncture between said check signal supply impedances.

2. The brain wave measuring apparatus according to claim 1 which further comprises a switch connected between said common juncture of said check signal supply impedances and said source of check signals.

3. The brain wave measuring apparatus according to claim 1 wherein said source of check signals comprises an AC signals oscillator.

4. The brain wave measuring apparatus according to claim 1 wherein said check signal supply impedances comprise resistors.

5. An apparatus for measuring the brain waves of a living body comprising a plurality of electrodes with their ends adapted to be contacted with the skin of said living body, a plurality of amplifiers, each having two input terminals connected with the other ends of said electrodes, a plurality of recording means for recording brain wave and signals resulting from a difference in contact resistance of said electrodes and respectively connected to the outputs of said amplifiers, a source of check signals, and a plurality of check signal supply impedances of equal impedance value connected between said source of check signals and respective ones of said other ends of said electrodes.

6. The brain wave measuring apparatus according to claim 5 wherein said impedances comprises resitors.

7. The brain wave measuring apparatus according to claim 5 wherein said source of check signals comprises an AC signals oscillator.

* * * * *

UNITED STATES PATENT OFFICE
CERTIFICATE OF CORRECTION

Patent No. 3,732,859          Dated May 15, 1973

Inventor(s) Keiji Tateno

It is certified that error appears in the above-identified patent and that said Letters Patent are hereby corrected as shown below:

Column 4, lines 9 and 10

"$R_g > R_1 + R_2 + R_{eg}$, $R_g > R_{eg} (R_1 + R_2 + R_{eg})$ and $R_g^2 > R_1 \cdot R_2$"

should be: -- $R_g \gg R_1 + R_2 + R_{eg}$, $R_g \gg R_{eg} (R_1 + R_2 + R_{eg})$ and $R_g^2 \gg R_1 \cdot R_2$ --

Column 5, lines 12 and 13,

"if $R_g > R_1 + R_2 + R_{eg}$, $R_g > R_g (R_1 + R_2 + R_{eg})$ and $R_g^2 > R_1 \cdot R_2$"

should be: -- if $R_g \gg R_1 + R_2 + R_{eg}$, $R_g \gg R_g (R_1 + R_2 + R_{eg})$ and $R_g^2 \gg R_1 \cdot R_2$ --

Signed and sealed this 22nd day of January 1974.

(SEAL)
Attest:

EDWARD M. FLETCHER, JR.
Attesting Officer

RENE D. TEGTMEYER
Acting Commissioner of Patents